April 14, 1970
C. J. LUCIA
3,505,863
METHOD AND APPARATUS FOR TESTING THE
ACCELERATION OF PRIME MOVERS
Filed Oct. 24, 1967
2 Sheets-Sheet 1
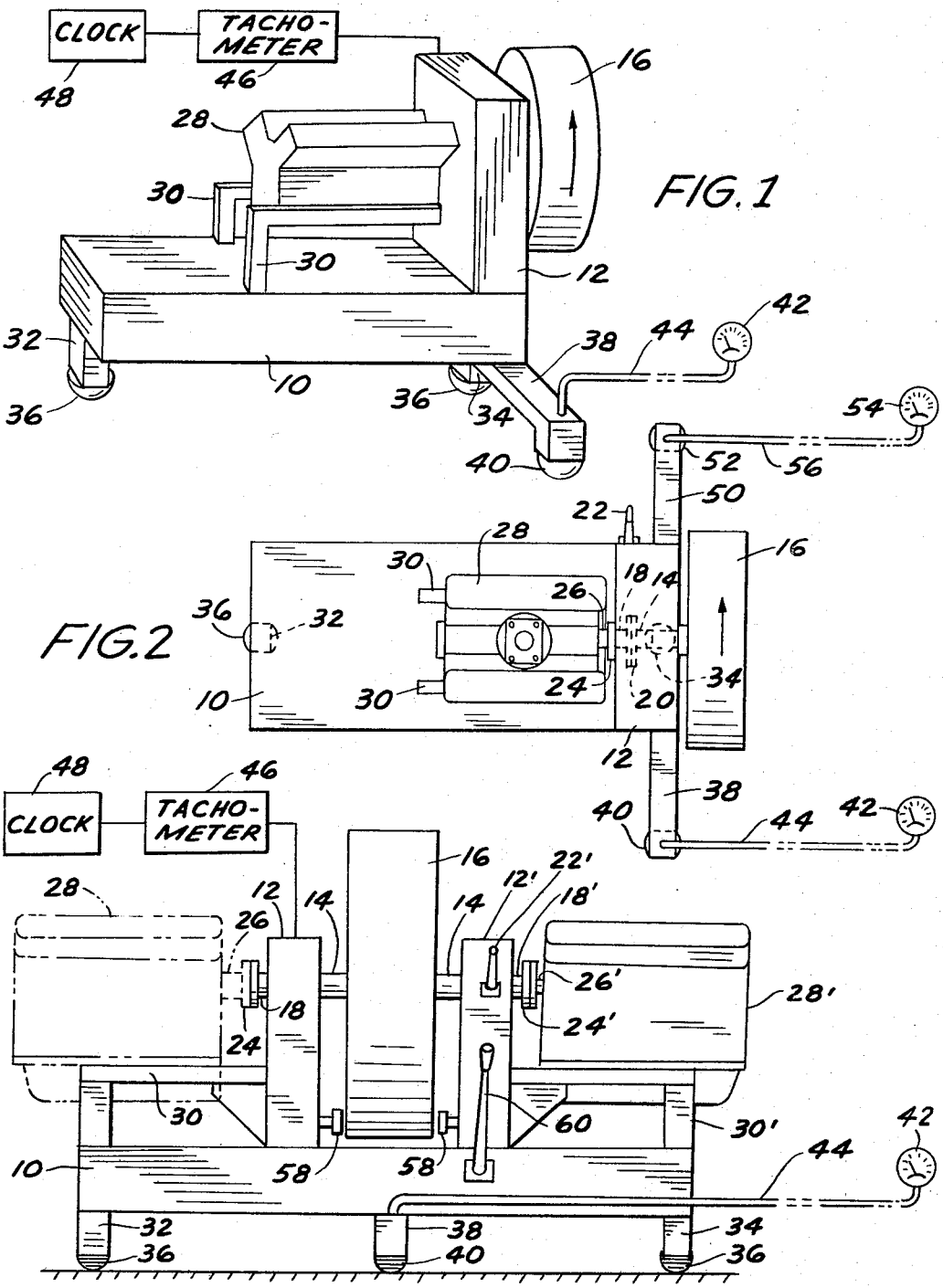
INVENTOR.
CARROLL J. LUCIA
BY
Hauke, Krass, Gifford
and Patalidis
ATTORNEYS April 14, 1970  C. J. LUCIA  3,505,863
METHOD AND APPARATUS FOR TESTING THE
ACCELERATION OF PRIME MOVERS
Filed Oct. 24, 1967  2 Sheets-Sheet 2
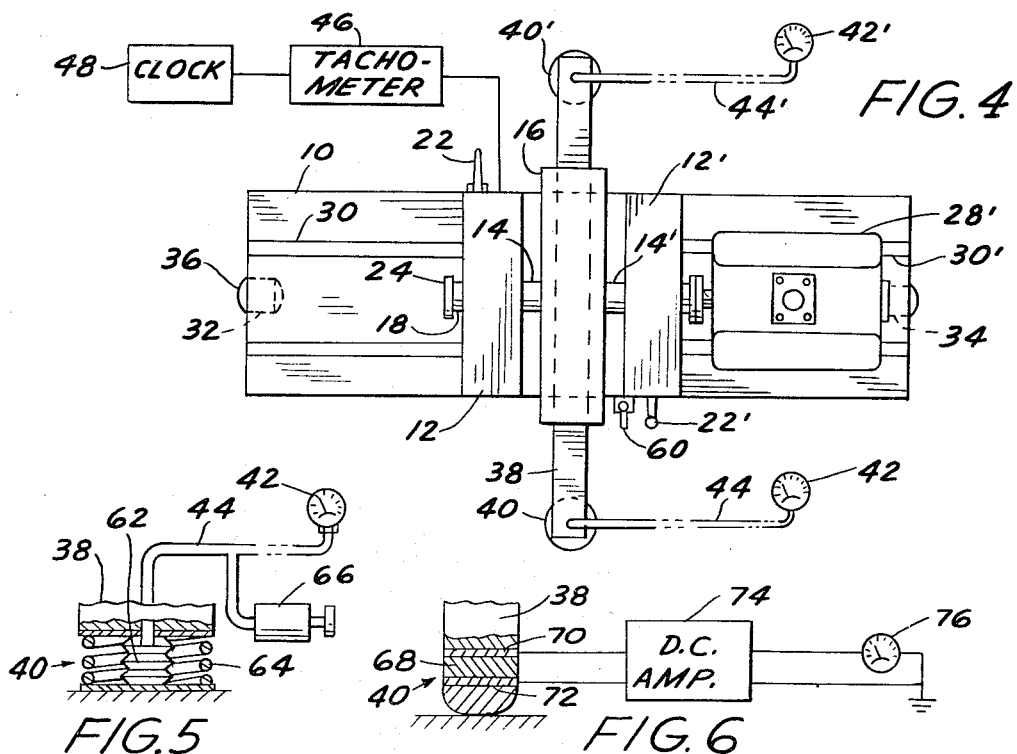
FIG. 4
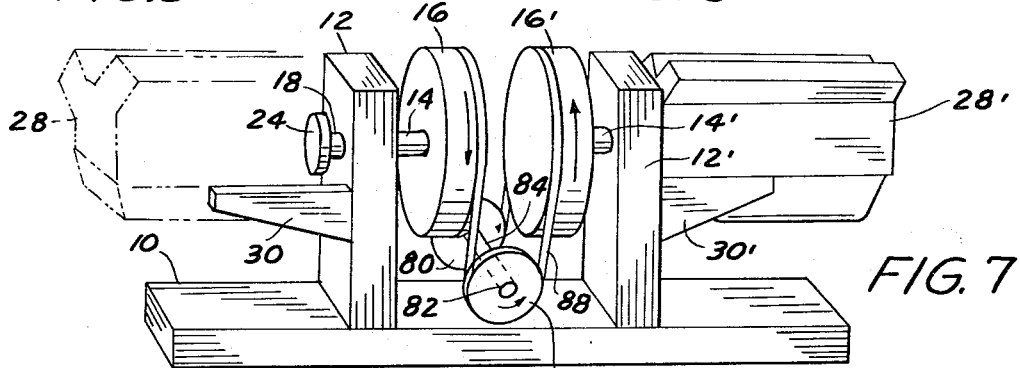
FIG. 5     FIG. 6
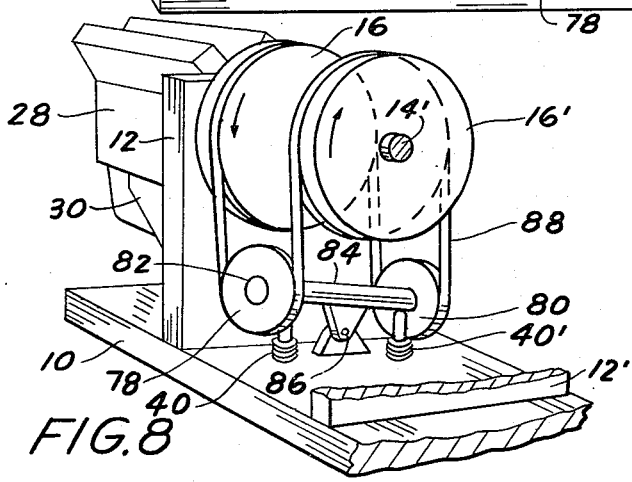
FIG. 7
FIG. 8
INVENTOR.
CARROLL J. LUCIA
BY
Hauke, Krass, Gifford
and Pataledis
ATTORNEYS United States Patent Office 3,505,863
Patented Apr. 14, 1970

3,505,863
METHOD AND APPARATUS FOR TESTING THE ACCELERATION OF PRIME MOVERS
Carroll J. Lucia, Box 38, Suamico, Wis. 54173
Filed Oct. 24, 1967, Ser. No. 677,574
Int. Cl. G01m 15/00
U.S. Cl. 73—116    7 Claims

ABSTRACT OF THE DISCLOSURE

A prime mover is tested, according to the invention, by having its output shaft coupled to a flywheel of known inertia which is driven and accelerated from a first predetermined angular velocity to a second predetermined velocity. The time taken for accelerating the flywheel is measured, and the average torque developed by the prime mover is derived from the time taken to accelerate the flywheel. The continuous torque developed, during acceleration, by the prime mover is monitored by measuring the reaction force exerted by the flywheel upon its support during acceleration. Alternately, the invention provides for a test stand on which a prime mover may be tested while a second prime mover is being installed or disconnected, and for comparing the torque developed by a prime mover to the torque of a reference prime mover.

BACKGROUND OF THE INVENTION

The present invention relates to the field of prime mover testing apparatus and methods. It is common practice in the industry to test factory assembled prime movers, such as electric motors, internal combustion engines, gas and steam turbines and the like, by sometime testing all the units manufactured or, more often, spot testing a predetermined percentage of a total production. It is also very common to measure output, performance, efficiency and the like of experimental prime movers and it would be desirable, although not often done, to bench test prime movers repaired or rebuilt in service shops and garages.

Normally, such tests of prime movers are effected by mounting the prime mover on a test stand and running the prime mover so as to measure the output shaft power or torque under controlled conditions. Often, the output shaft is connected to a dynamometer or brake in order to provide a means of absorbing the energy developed by the prime mover and of measuring such output energy. Often gauges and instruments are connected to diverse portions of the prime mover in order to supply information with respect to, for example, temperatures of diverse parts, pressures in the intake manifold or combustion chambers of internal combustion engines, back pressure at the exhaust, etc. so as to provide a plurality of quantitative data relative to the prime movers being tested.

Dynamometers and the like are costly and delicate apparatus, often difficult to maintain in good operating condition, and require substantially skilled personnel for proper operation and interpretation of the test data.

SUMMARY OF THE INVENTION

The present invention provides a prime mover test method and apparatus having only a heavy flywheel as a moving part, which can be manufactured at low cost and which can provide an indication of the output power or torque of a prime mover without the use of complicated, costly and delicate instruments. Consequently, the present invention provides for storing rather than absorbing the energy developed by a prime mover and thus provides a precise test and diagnosis apparatus for research departments, schools, repair and service shops and the like, where such apparatus are most needed, without requiring any substantial capital investment, or particular skills on the part of the users.

The many objects and advantages of the present invention will become apparent when the accompanying description of some of the best modes contemplated to practice the invention is read in conjunction with the accompany drawings wherein like numerals refer to like or equivalent parts and in which:

BRIEF DESCRIPTION OF THE DRAWINGS

FIG. 1 is a schematic perspective view of an example of a prime mover test apparatus according to the present invention;

FIG. 2 is a top plan view of the apparatus of FIG. 1;

FIG. 3 is a schematic side elevation view of another example of test apparatus according to the present invention, permitting a prime mover to be tested while another prime mover is in the process of being installed on the apparatus;

FIG. 4 is a top plan view of the apparatus of FIG. 3;

FIG. 5 is a sectional view of a portion of the apparatus of FIGS. 1–4;

FIG. 6 is a view similar to FIG. 5 but showing an alternate arrangement;

FIG. 7 is a schematic perspective view of a further example of testing apparatus according to the present invention, permitting to test a prime mover by comparison to a second or reference prime mover; and FIG. 8 is a partial perspective end view of the apparatus of FIG. 7, with portions broken away.

DESCRIPTION OF THE PREFERRED EMBODIMENTS

As shown in FIGS. 1 and 2, an example of test apparatus according to the present invention comprises a substantially rigid support structure including a longitudinally extending frame member or base 10 having a vertically extending pedestal 12 proximate one end thereof. In the example of structure shown, the pedestal is hollow and is adopted to support by appropriate bearings, not shown, a shaft 14 adapted to journal in the bearings and having a projecting end on which is mounted a substantially heavy flywheel 16. A second shaft 18 is supported by pedestal 12 by means of appropriate bearings, not shown, in alignment with flywheel shaft 14 and is adapted to be controllably connected therewith by means of, for example, clutch mechanism 20 controlled by lever 22. Shaft 18 has an end projecting over base frame member 10 which is provided with a coupling means 24 for connection to the output shaft 26 of a prime mover 28, shown in the drawing as being an internal combustion engine. An appropriate cradle or support bracket 30 is provided on frame base 10 for removably mounting the prime mover 28.

It will be appreciated by those skilled in the art that other types of prime movers than the one specifically illustrated in the drawing, such as electric motors, gas turbines, internal combustion engines of the radial or rotary type, etc., may be effectively tested by mounting on support structure 10 or on pedestal 12 by appropriate means. It is also evident that clutch mechanism 20 may be disposed in any appropriate location providing a disconnectable drive of flywheel 16, and may be of any appropriate convenient structure, including the structure disclosed in U.S. Patent No. 3,060,730.

Support structure base 10 is supported from the ground by way of a pair of legs 32 and 34, each having an appropriate pad 36 engaging the ground, legs 32 and 34 being preferably disposed in a vertical plane passing through the center of gravity, or alternatively being disposed close to such a plane passing through the center of gravity of the apparatus, with an appropriate prime mover mounted thereon. In order to properly balance the support structure with the prime mover mounted thereon such that the center of gravity of the structure falls on the fulcrum line of legs 32 and 34, appropriate counterbalancing weights, not shown, are preferably adjustably mounted to a transverse support fastened to the base 10 or to the pedestal 12. Support structure base 10 is further provided with at least one horizontally projecting leg 38 having a pressure sensing pad 40 disposed on the end thereof in engagement with the ground. An appropriate gauge 42 is connected by an appropriate line 44 to the pressure pad 40 so as to provide an indication of the reaction exerted by the ground upon the pressure pad.

The apparatus further comprises a tachometer 46 appropriately connected, by means well known in the art, to the flywheel shaft 14 to supply an indication of the rotating velocity of the flywheel, for example in revolutions per minute. A clock 48 may also be provided where precision in the information obtained by the test apparatus of the invention is desired, although the clock may be dispensed with by utilizing an ordinary stop watch or the like.

In order to test the prime mover 28 by means of the apparatus of the invention, the prime mover is started, and clutch 20 is engaged by means of lever 22. Prime mover 28 is accelerated until an appropriate rotational velocity of flywheel 16 as driven by the prime mover is indicated by tachometer 46, at which time the clock 48, or the stop watch, is started, and the prime mover is subsequently accelerated, for example at full open throttle, until tachometer 46 gives an indication of a second predetermined rotational velocity of the flywheel, at which time clock 48, or the stop watch is stopped. It is obvious that tachometer 46 and clock 48 may be interconnected such that the clock may be automatically respectively started and stopped at such predetermined velocities.

The moment of inertia of flywheel 16 is known, consequently the amount of energy required to accelerate the flywheel from a predetermined angular velocity to a second predetermined angular velocity is also known, with the result that the time shown by clock 48 as having elapsed during such acceleration of the flywheel from the first predetermined velocity to the second predetermined velocity is an inverse function of the average torque developed by the prime mover during acceleration. Gauge 42 continuously records a predetermined pressure or reaction force exerted by the ground upon pressure pad 40 resulting from the fact that the acceleration of flywheel 16, being assumed to rotate clockwise, as seen from the right end of FIGS. 1 and 2, causes a reactive force transmitted by pad 40 to the ground which is directly proportional to the instantaneous torque developed by the prime mover, as a result of permitting the whole frame assembly to be able to swing or rock with respect to the line of contact with the ground of pads 36 of legs 32–34. Consequently, with appropriate calibration and graduation indicia on its dial, gauge 42 is adapted to give, at all times, an indication of the instantaneous torque developed by the prime mover during acceleration. It is obvious that gauge 42 may be replaced with, or interconnected to, an appropriate recorder for providing a chart of the torque developed by the engine, in function of time or in function of r.p.m. at the output thereof.

The test apparatus according to the present invention is also useful is providing an indication of the value of the torque or energy dissipated as looses due to inertia, friction, etc., within the prime mover itself. This is accomplished, for example, by providing support frame base 10 with a second horizontally projecting leg 50 having on the end thereof an appropriate pressure pad 52 connected to an appropriate gauge 54 by way of a line 56. With legs 32–34 disposed in a straight line in the vertical plane passing through the center of gravity of the apparatus, when flywheel 16 is allowed to drive prime mover 28 with the input energy supply to the prime mover being cut off, the resistance torque or negative torque of the moving parts of prime mover 28 causes some kinetic energy of the flywheel to be dissipated, which in turn decelerates the flywheel 16, with the result that a reactive torque applied to support frame base 10 tends to swing or rock the support frame base with respect to the line of contact of pads 26 of legs 32–34 with the ground, such that gauge 54 provides a continuous instantaneous indication of the resistance or negative torque of the prime mover. The average resistance or negative torque may be determined by measuring the time that the flywheel 16 took to decelerate from a first predetermined velocity to a second predetermined velocity.

It is obvious that by disposing legs 32–34 a given distance beyond the longitudinal vertical plane passing through the center of gravity of the apparatus, leg 50 and gauge 54 may be omitted, and that gauge 42 becomes adapted to give an indication of both the positive and negative torques of the prime mover during, respectively, acceleration and deceleration of the flywheel. It is also obvious that correction factors must be taken into consideration, such as correction factors regarding the friction between the rotating flywheel 16 and the ambient air, or windage, and friction of the bearings supporting shaft 18 and shaft 14 on which the flywheel is mounted, if very precise test results are desired, although such correction factors are of very small value. Such correction factors are determined, once for all subject only to occasional recalibrations, by driving the flywheel at a first predetermined velocity by means of a prime mover, disconnecting the drive from the prime mover and allowing the flywheel to freely decelerate to a second lower velocity. The time taken for such deceleration is inversely proportional to the energy absorbed through windage and bearing friction losses.

Further instrumentation may be provided in combination with the test apparatus of the present invention, such as fuel flow meters, temperature gauges, pressure gauges and the like, as may be required to provide any appropriate data with respect to the prime mover being tested.

The example of the invention illustrated in FIGS. 3–4 is substantially alike the hereinbefore described embodiment with the difference however that flywheel 16 is supported by means of its shaft 14 from two pedestals 12 and 12' disposed symmetrically on both sides of the flywheel. Flywheel 16 is disposed substantially at mid-distance between the two ends of support frame base 12, with its axis of rotation substantially in a vertical longitudinal plane passing through the center of gravity of the apparatus. Shaft 14 is controllably connectable to respectively shaft 18 and shaft 18' by means of separate clutch mechanisms, not shown, operable respectively by levers 22 and 22', such that two prime movers may be mounted respectively on cradles or supports 30 and 30' with their output shafts connected respectively to shafts 18 and 18' by means of coupling means 24 and 24', such that the flywheel 16 is capable of being driven by either one of the prime movers. In this manner, a prime mover may be in the process of being mounted upon the test apparatus, while the other prime mover is in the process of being tested. Such an arrangement provides a maximum of useful testing time on the apparatus and results in increased efficiency in the testing prime movers taken from an assembly line, or of prime movers rebuilt or repaired on a production basis.

Preferably, the apparatus of FIGS. 3–4 includes a brake mechanism which may be in the form of a caliper brake, or the like, including appropriate friction plates 58 engageable with the lateral surfaces of the flywheel under the control of manually operated brake lever 60. Such a brake mechanism is well known in the art and does not require elaborate description. The purpose of the brake mechanism is to stop or slow the flywheel to a manageable speed before one of the prime movers to be tested is connected thereto by engaging the appropriate clutch. The operation of the apparatus of FIGS. 3–4 is as previously explained with respect to the embodiment of FIGS 1–2, appropriate gauges 42 and 42′ being provided for giving an indication of the instantaneous torque developed by either of the prime movers being tested, while the average torque is being given by the time that it takes to accelerate flywheel 16 from a first predetermined velocity to a second predetermined velocity.

FIG. 5 schematically illustrates the details of an example of the pressure pad 40 defined by a bellows 62 disposed between the ground and horizontally projecting leg 38. A coil spring 64 is also disposed between the ground and projecting leg 38, as shown in the drawing, or may be disposed inside of the bellows or built-in therewith. The interior of the bellows 62 is filled with a pressurized fluid and is placed in communication by a line 44 with pressure gauge 42, the whole system being filled with pressurized fluid by means of, for example, a fluid tank-pump arrangement such as shown at 66. Consequently, when the apparatus frame is rocked as a result of the reaction torque developed by the flywheel during acceleration, bellows 62 is compressed in function of the value of such reaction torque, with the result that gauge 42 provides a visual indication of such torque.

FIG. 6 illustrates an example of an alternate torque indicating arrangement wherein the pressure pad 40 consists of a piezoelectrical crystal 68 disposed between leg 38 and the ground. Pressure applied across faces 70 and 72 of the piezoelectrical crystal causes a voltage differential between such faces which is proportional to the pressure and which, after amplification by DC amplifier 74 is used to provide an indication of the torque by way of gauge 76.

FIGS. 7–8 represents a further modification of the present invention, wherein support frame member or base 10 is normally disposed directly on the ground and is provided with a pair of pedestals 12 and 12′ each adapted to support a flywheel, shown at 16 and 16′. The shafts 14 and 14′ of the respective flywheels are connectable by clutch means, not shown, to the output shaft of prime movers 28 and 28′ mounted on support cradle 30 and 30′ and individually driving an appropriate flywheel. A pair of pulleys 78 and 80 are mounted on the end of a shaft 82 journalled in a housing 84, transversely supported from support frame member 10, substantially at mid-distance between the two flywheels, by way of pivot 86. And endless belt 88 is wound part of the way around the periphery of flywheels 16 and 16′ and partly around the periphery of pulleys 80 and 82, as shown, such that the two flywheels are caused to rotate in unison in opposite directions. Pressure pickup pads 40 and 40′ are disposed at both ends of housing 84, proximate pulleys 80 and 82, such that any force tending to swing housing 84 in one direction or the other can be measured.

In operation, the output shafts of prime movers 28 and 28′ are connected respectively to flywheels 16 and 16′ which they respectively and individually drive. When the two prime movers are simultaneously accelerated, the flywheels are caused to rotate, for example, in the direction of the arrows in opposite directions. If the torques developed by the two prime movers are substantially equal, neither of the flywheels tends to drive or be driven by the other, and housing 84 of pulley shaft 82 remains substantially horizontal, with equal forces being detected by pressure pads 40. However, if one of the prime movers, for example, prime mover 28′, develops more torque than the other prime mover, the flywheel 16′ connected to the output shaft of prime mover 28′ tends to be accelerated more than the other flywheel 16, therefore tends to drive flywheel 16. In the example of operation arbitrarily chosen, flywheel 16′ tending to drive flywheel 16, the pulley 78 is urged upwardly by the action of belt 88 with the result that pressure pad 40′ gives an indication of an increase of pressure while pressure pad 40 gives an indication of a decrease of pressure as a result of the tendency of housing 84 to swing around pivot 86 in a clockwise direction, as seen in FIG. 8. When prime mover 28 develops more instantaneous torque than prime mover 28′, the opposite action results. Pressure pads 40 and 40′ are connected to appropriate gauges, not shown, providing a visual display of the value of the torque differential.

Consequently by means of the apparatus of FIGS. 7–8, a prime mover may be compared to a reference prime mover or two prime movers, such as modified internal combustion engines, may be competitively opposed to each other without the attendant danger resulting from opposing competitive motor vehicles on a drag race track or the like.

While the invention has been described, for illustrative purpose only, in connection with specific embodiments and specific uses, various modifications thereof will occur to those skilled in the art and may be made thereto without departing from the spirit and scope of the invention as set forth in the appended claims.

What is claimed is:

1. A method for determining the average torque of a prime mover having a rotating output shaft, said method comprising:
   connecting said output shaft to a flywheel of known inertia;
   accelerating said flywheel by means of said prime mover from a first predetermined angular velocity to a second predetermined angular velocity; and
   measuring the time taken for accelerating from said first velocity to said second velocity;
   said time being inversely proportional to the average torque developed by said prime mover during acceleration of said flywheel from said first velocity to said second velocity.

2. The method of claim 1 further comprising:
   continuously monitoring the instantaneous torque developed by said prime mover as a function of the reactive force exerted by said flywheel during acceleration from said first velocity to said second velocity.

3. The method of claim 1 further comprising:
   decelerating said flywheel from a third predetermined angular velocity to a fourth predetermnied angular velocity by allowing said flywheel to drive said prime mover; and
   measuring the time taken decelerating from said third velocity to said fourth velocity, whereby said time is inversely proportional to the prime mover resistance torque.

4. The method of claim 3 further comprising:
   continuously monitoring the instantaneous resistance torque absorbed by said prime mover while driven by said flywheel as a function of the reactive force exerted by said prime mover during deceleration from said third velocity to said fourth velocity.

5. The method of claim 1 further comprising:
   connecting the output shaft of a reference prime mover to a second flywheel of inertia equal to said first mentioned flywheel;
   interconnecting said flywheels to rotate in unison in opposite directions;
   accelerating said flywheels by means of respectively said prime mover and said reference prime mover from said first angular velocity to said second predetermined angular velocity; and
   continuously monitoring the value and the direction of the instantaneous resultant reaction torque developed during the acceleration of said flywheels for obtaining a qualitative and quantitative comparison of said prime movers as a function of the difference in torques developed by said respective prime movers while accelerating said flywheels.

6. An apparatus for testing at least one prime mover having a rotating output shaft, said apparatus comprising:
a support structure;
means for mounting said prime mover on said support structure;
a first flywheel of known inertia rotatably mounted on said support structure;
controllable coupling means for connecting and disconnecting said prime mover output shaft to said flywheel;
means for measuring the time taken for accelerating said first flywheel from a first predetermined angular velocity to a second predetermined angular velocity as an inverse function of the average torque developed by said prime mover during said acceleration;
means for mounting a second prime mover on said support structure;
a second flywheel rotatably mounted on said support structure, said second flywheel having an inertia substantially equal to that of said first flywheel;
controllable coupling means for connecting and disconnecting the output shaft of said second prime mover to said second flywheel;
means for interconnecting said flywheels for causing said flywheels to rotate in unison in opposite directions; and
means for continuously monitoring the value and the direction of the instantaneous resultant torque developed during the acceleration of said flywheels for obtaining a qualitative and quantitative comparsion of said prime movers as a function of the difference in torques developed by said respective prime movers while accelerating said flywheels.

7. An apparatus for testing at least one prime mover having a rotating output shaft, said apparatus comprising:
a support structure;
means for mounting said prime mover on said support structure;
a first flywheel of known inertia rotatably mounted on said support structure;
controllable coupling means for connecting and disconnecting said prime mover output shaft to said flywheel;
means for measuring the time taken for accelerating said first flywheel from a first predetermined angular velocity to a second predetermined angular velocity as an inverse function of the average torque developed by said prime mover during said acceleration;
means for mounting a second prime mover on said support structure;
controllable coupling means for connecting and disconnecting the output shaft of said second prime mover to said flywheel;
means for continuously monitoring the instantaneous torque developed by either one of said prime movers as a function of the reactive force exerted by said flywheel during acceleration from said first velocity to said second velocity;
means for monitoring the resistance torque of either one of said prime movers as a function of the reactive force exerted by said prime mover during deceleration of said flywheel from a third velocity to a fourth velocity while said flywheel is caused to drive said prime mover;
said flywheels are disposed with their axes of rotation in alignment;
a differential drive mechanism interconnects said flywheels;
said differential drive mechanism has pivotable support means relatively to said support structure permitting limited pivotable motion in one of two opposite directions according to which one of the flywheels drives the other; and
means are provided for giving an indication of the force tending to pivot said drive mechanism in each of said directions.

References Cited
UNITED STATES PATENTS 3,279,244 10/1966 Emmerling _____ 73—136
3,289,471 12/1966 Maxwell _____ 73—136 X
3,331,200 7/1967 Byron et al.

JERRY W. MYRACLE, Primary Examiner

U.S. Cl. X.R.

73—136